(12) United States Patent
Oroskar et al.

(10) Patent No.: US 8,340,009 B1
(45) Date of Patent: Dec. 25, 2012

(54) SYSTEMS AND METHODS FOR DISABLING A QUICK PAGING CHANNEL IN A WIRELESS COMMUNICATION SYSTEM

(75) Inventors: Siddharth S. Oroskar, Overland Park, KS (US); Sachin R. Vargantwar, Overland Park, KS (US); Deveshkumar Narendrapratap Rai, Overland Park, KS (US); Debasish Sarkar, Irvine, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 324 days.

(21) Appl. No.: 12/683,259

(22) Filed: Jan. 6, 2010

(51) Int. Cl.
*G08C 17/00* (2006.01)

(52) U.S. Cl. ........................................ 370/311

(58) Field of Classification Search .................. None
See application file for complete search history.

(56) References Cited

U.S. PATENT DOCUMENTS

| | | | |
|---|---|---|---|
| 6,307,846 B1* | 10/2001 | Willey | 370/329 |
| 6,577,608 B1 | 6/2003 | Moon et al. | |
| 6,650,912 B2 | 11/2003 | Chen et al. | |
| 6,687,285 B1* | 2/2004 | Jou | 455/458 |
| 6,928,293 B2* | 8/2005 | Park et al. | 455/458 |
| 7,212,831 B2 | 5/2007 | Lee | |
| 7,983,698 B2* | 7/2011 | Kwak et al. | 455/458 |
| 2002/0093920 A1* | 7/2002 | Neufeld et al. | 370/311 |
| 2003/0114132 A1* | 6/2003 | Yue | 455/343 |
| 2006/0094437 A1* | 5/2006 | Sinnarajah et al. | 455/452.1 |
| 2006/0227734 A1* | 10/2006 | Tu et al. | 370/311 |
| 2008/0081613 A1* | 4/2008 | Yang et al. | 455/426.1 |
| 2008/0232289 A1* | 9/2008 | Willey | 370/311 |
| 2009/0280847 A1* | 11/2009 | Ramesh et al. | 455/515 |
| 2010/0260090 A1* | 10/2010 | Santhanam et al. | 370/312 |
| 2010/0260112 A1* | 10/2010 | Ramesh et al. | 370/328 |

* cited by examiner

*Primary Examiner* — Anh-Vu Ly (57) ABSTRACT

Embodiments disclosed herein provide methods and systems for disabling a quick paging channel to reduce missed pages. In an embodiment, a method includes, during at least an initial period of time corresponding to a mobile communication device of the plurality of mobile communication devices, enabling the quick paging channel used for transferring paging information to the mobile communication device. The method also includes processing a device profile for the mobile communication device to determine if the quick paging channel should be disabled during a next period of time corresponding to the mobile communication device. In response to determining that the quick paging channel should be disabled, the method also includes disabling the quick paging channel during the next period of time corresponding to the mobile communication device.

17 Claims, 10 Drawing Sheets

CALL RECORD 600

| CALL ID | TIME | DIRECTION | SOURCE | DESTINATION |
|---|---|---|---|---|
| 1 | 00:01 | INCOMING | P2 | MCD 301 |
| 2 | 01:02 | OUTGOING | MCD 301 | MCD 304 |
| 3 | 01:17 | INCOMING | P1 | MCD 301 |
| 4 | 01:19 | INCOMING | P1 | MCD 301 |
| 5 | 01:30 | INCOMING | P3 | MCD 301 |

FIGURE 6

DEVICE RECORD 710

| DEVICE ID | MANUFACTURER | MODEL # | LOCATION | MODEL YEAR | PAGE HISTORY |
|---|---|---|---|---|---|
| MCD 301 | X | 12-09345 | 39 Lat; -105 Lon | 2002 | MISSED 1 |

DEVICE RECORD 720

| DEVICE ID | MANUFACTURER | MODEL # | LOCATION | MODEL YEAR | PAGE HISTORY |
|---|---|---|---|---|---|
| MCD 302 | Y | Z1009567 | 39 Lat; -107 Lon | 2009 | MISSED 3 |

SYSTEMS AND METHODS FOR DISABLING A QUICK PAGING CHANNEL IN A WIRELESS COMMUNICATION SYSTEM

TECHNICAL BACKGROUND

Aspects of the disclosure are related to the field of communications, and in particular, paging in wireless communication networks.

TECHNICAL BACKGROUND

In wireless communication systems, a mobile communication device can register with an access node and can remain in an idle state to conserve power. The access node typically transfers information, often referred to as pages, to the mobile communication device to indicate incoming calls, messages, or other alerts. In order to receive these communications, the mobile communication device must transition to an active state during specified times.

Many wireless communication systems have incorporated a quick paging channel to reduce the amount of time the mobile communication device has to be in the active state, thus, reducing power consumption of the mobile communication device. However, if the mobile communication device improperly detects quick paging information received on a quick paging channel, then missed pages occur. Furthermore, missed pages are not uncommon because the physical quick paging channels generally do not have error correction protection.

OVERVIEW

Embodiments disclosed herein provide methods and systems for disabling a quick paging channel to reduce missed pages. In an embodiment, a method includes, during at least an initial period of time corresponding to a mobile communication device of the plurality of mobile communication devices, enabling the quick paging channel used for transferring paging information to the mobile communication device. The method also includes processing a device profile for the mobile communication device to determine if the quick paging channel should be disabled during a next period of time corresponding to the mobile communication device. In response to determining that the quick paging channel should be disabled, the method also includes disabling the quick paging channel during the next period of time corresponding to the mobile communication device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
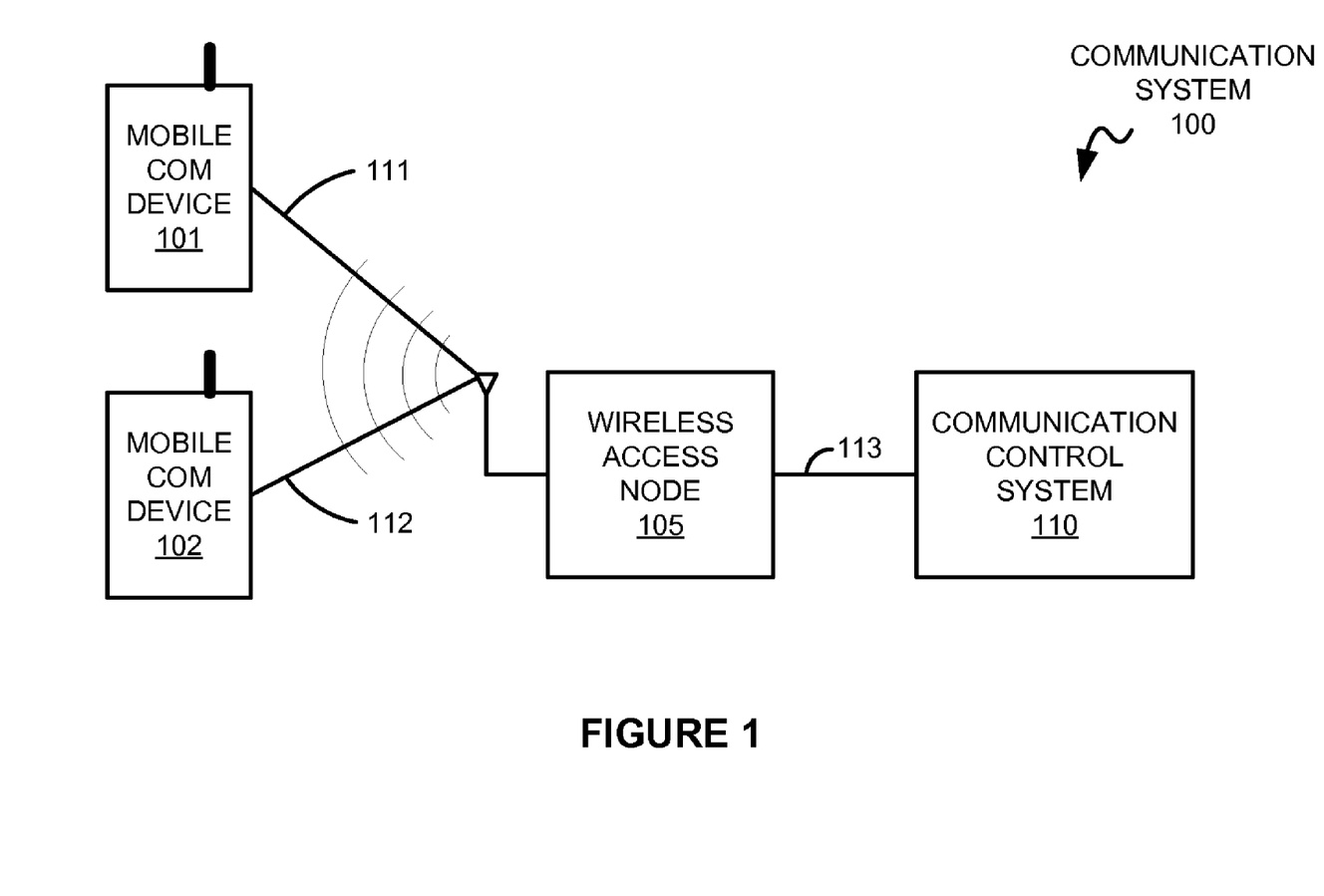
FIG. 1 illustrates a communication system in an embodiment.

FIG. 1 illustrates quick paging in a communication system 100. In this example, communication system 100 includes wireless mobile communication devices 101 and 102, wireless access node 105, and communication control system 110. Mobile communication devices 101 and 102 communicate with wireless access node 105 over wireless links 111 and 112, respectively. Wireless access node 105 and communication control system 110 communicate over communication link 113. In this example, only two communication devices, mobile communication devices 101 and 102, are shown for simplicity. As those skilled in the art will appreciate, other embodiments of system 100 could include multiple mobile communication devices.

Communication system 100 may be in communication with multiple mobile communication devices as well as other communication systems and networks. Communication system 100 communicates with the mobile communication devices over quick paging and paging channels. The quick paging and paging channels are each divided into numerous time periods that correspond to a different one of the mobile communication devices.

In operation, when a call, message, or other alert is received at communication system 100, communication control system 110 schedules a quick page for the mobile communication device to which the call, message, or alert is directed. Wireless access node 105 then sets to active the quick paging indicator bits corresponding to that mobile communication device in the quick paging signal.

Missed pages occur if the mobile communication device improperly determines the quick packing indicator bits to be inactive. Therefore, communication system 100 may disable the quick paging channel for the mobile communication device based on a device profile.

Figure 2:
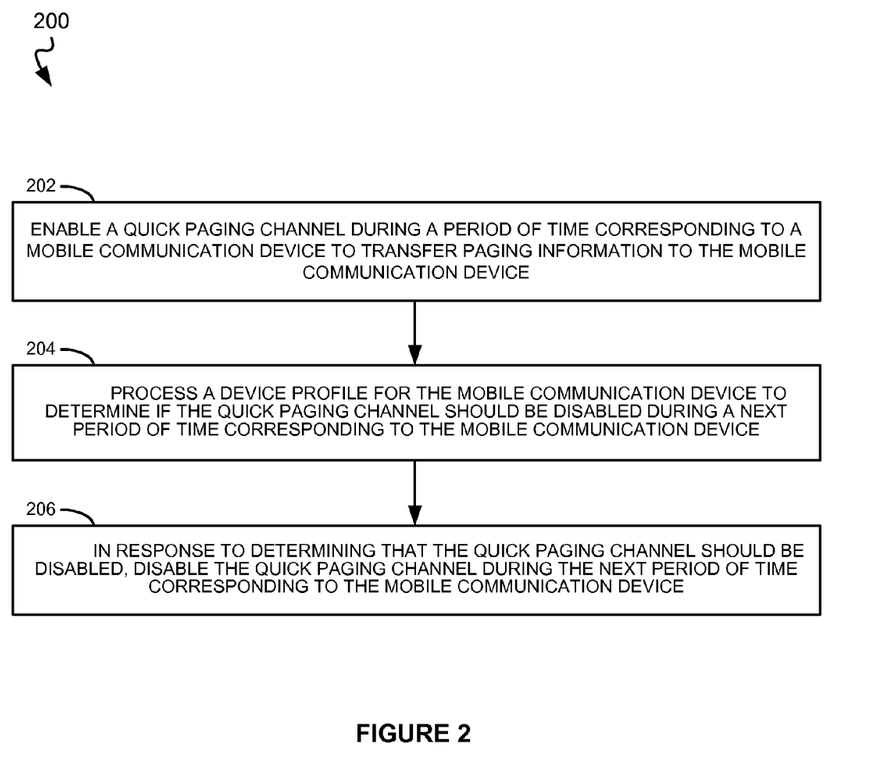
FIG. 2 illustrates the operation of a communication system according to an embodiment.

FIG. 2 is a flow diagram that illustrates paging process 200. Components of communication system 100 are used for illustrative purposes. In operation, communication control system 110 enables a quick paging channel during a period of time corresponding to a mobile communication device in order to transfer quick paging information to the mobile communication device (step 202). For example, communication control system 110 may enable the quick paging channel during a time period corresponding to mobile communication device 101 in order to transfer quick paging information to mobile communication device 101.

In this example, communication control system 110 may then transfer a control message to wireless access node 105 over communication link 113 directing wireless access node 105 to transmit a wireless quick paging signal over communication links 111 and 112. The wireless quick paging signal may include multiple time periods with each time period corresponding to particular mobile communication device or group of mobile communication devices. For instance, the wireless quick paging signal in this example may have time periods corresponding to each of and/or both of mobile communication devices 101 and 102.

Communication control system 110 processes a device profile for the mobile communication device in order to determine if the quick paging channel should be disabled during a next period of time corresponding to the mobile communication device (step 204). For example, communication control system 110 may process a device profile for mobile communication device 101 and determine that the quick paging channel should be disabled during the next period of time corresponding to mobile communication device 101.

In some embodiments, communication control system 110 may process the device profile in response to some event. For example, communication control system 110 may process the device profile of mobile communication device 101 in response to a new page for mobile communication device 101, initialization of mobile communication device 101 with wireless access node 105, or after expiration of a fixed period of time.

In response to determining that the quick paging channel should be disabled, communication control system 110 disables the quick paging channel during the next period of time corresponding to the mobile communication device (step 206). For example, in response to determining that the quick paging channels should be disabled for mobile communication device 101, communication control system 110 disables the quick paging channel during the next time period corresponding to mobile communication device 101.

In this example, communication control system 110 may then transfer a second control message to wireless access node 105 over communication link 113 directing wireless access node 105 to transmit a wireless quick paging signal over wireless links 111 and 112 with the quick paging channel disabled during the period of time corresponding to mobile communication device 101.

Advantageously, by disabling the quick paging channel based on a device profile, a mobile device is prompted to read the corresponding assigned time slot on the paging channel. In this way, missed pages are reduced. Other advantages will become apparent to one skilled in the art upon reading and appreciating the following detailed description of the invention.

Figure 3:
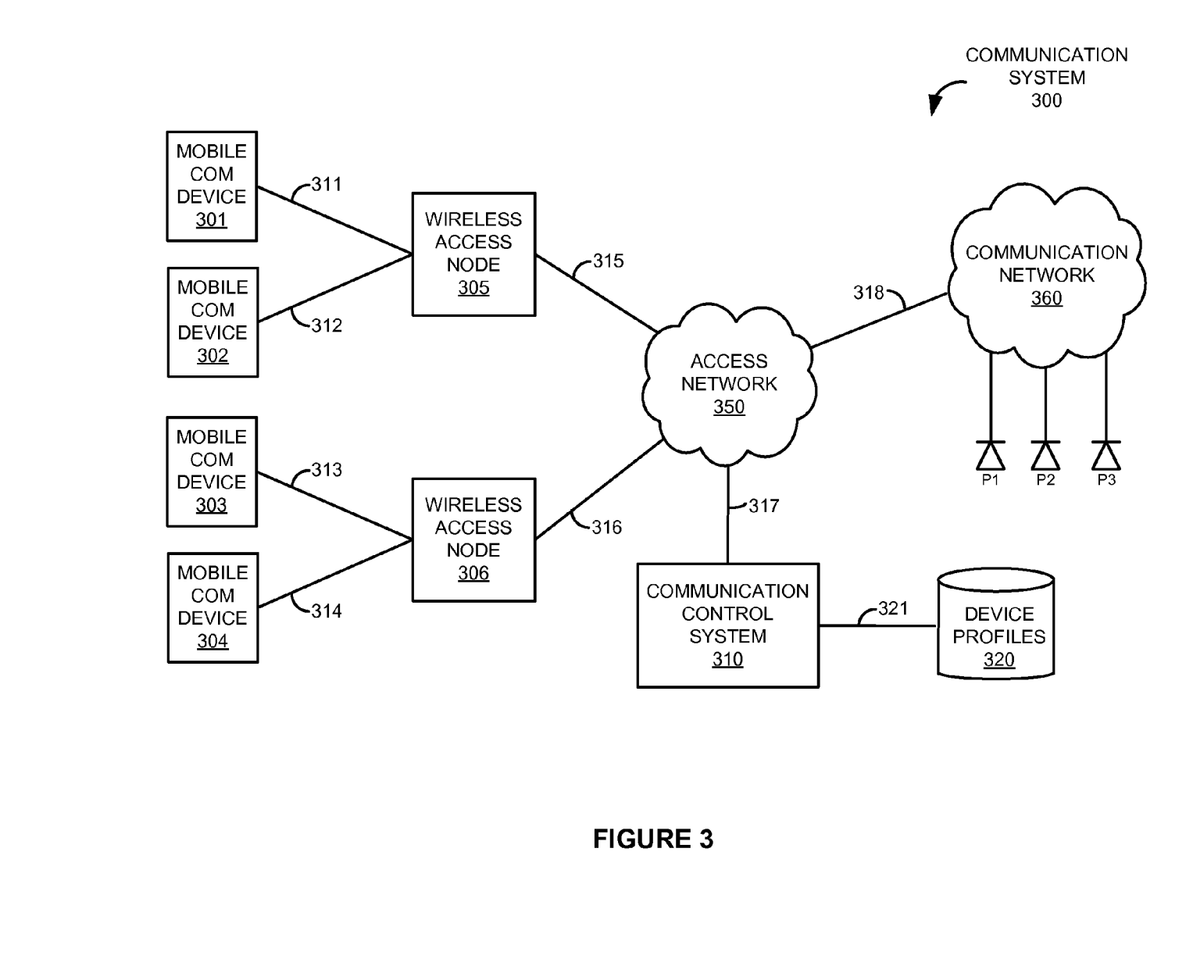
FIG. 3 illustrates another communication system according to an embodiment.

FIG. 3 illustrates quick paging in communication system 300. Communication system 300 is an example of communication system 100, although communication system 100 may use alternative configurations. Communication system 300 comprises mobile communication devices 301-304, wireless access nodes 305 and 306, access network 350, communication control system 310, device profiles database 320, communication network 360, and telephone systems P1, P2, and P3.

Mobile communication devices 301 and 302 communicate with wireless access node 305 over wireless communication links 311 and 312, respectively. Mobile communication devices 303 and 304 communicate with wireless access node 306 over wireless communication links 313 and 314, respectively. Wireless access nodes 305 and 306 communicate with access network 350 over communication links 315 and 316. Communication control system 310 communicates with access network 350 over communication link 317. Telephone systems P1, P2, and P3 communicate with communication network 360 over communication links 321, 322, and 323, respectively. Communication network 360 communicates with access network 350 over communication link 318.

Communication control system 310 comprises a computer system and communication interface. Communication control system 310 may also include other components such as a router, server, data storage system, and power supply. Communication control system 310 may reside in a single device or may be distributed across multiple devices. Communication control system 310 is shown externally to communication network 350, but communication control system 310 could be integrated within the components of communication network 350. Communication control system 310 could be a mobile switching center, network gateway system, Internet access node, media server, application server, IMS core, service node, or some other communication system—including combinations thereof. Communication control system 310 may transmit control messages over access network 350 directing access nodes 305 and/or 306 to transmit a wireless page to one or more of the mobile communication devices.

Communication control system 310 comprises a computer system and other components for processing device profiles and generating quick paging control messages. Communication control system 310 can access a device profiles database 320 which includes a plurality of device profiles corresponding to one or more mobile communication devices. The device profiles comprise profile information which may include call records, device records, and/or other information useful for generating and/or disabling quick page signaling.

Wireless access nodes 305 and 306 could be base stations, Internet access nodes, telephony service nodes, wireless data access points, or some other wireless communication systems—including combinations thereof.

Figure 4:
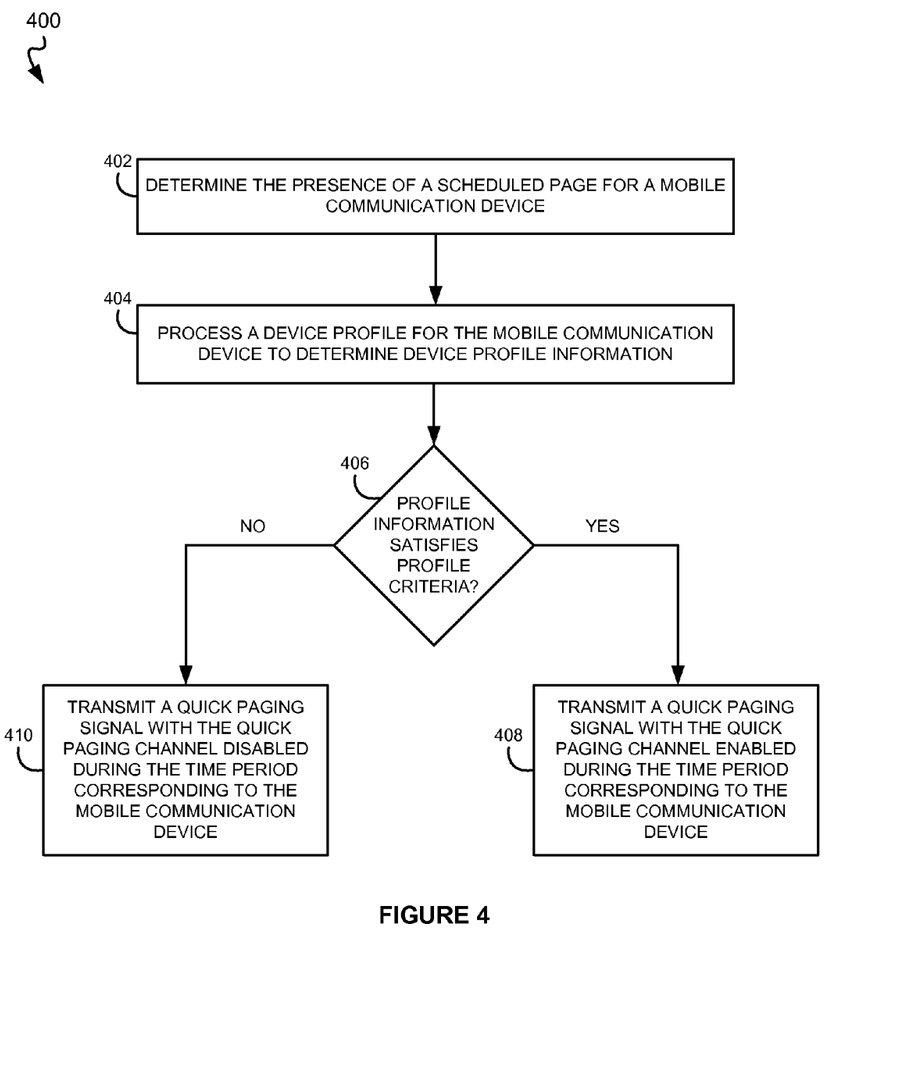
FIG. 4 illustrates the operation of another communication system according to an embodiment.

FIG. 4 is a flow diagram that illustrates the operation of communication system 300 according to an embodiment. In this example, wireless access node 305 transmits a wireless quick paging signal to mobile communication devices 301 and 302 over a quick paging channel. The wireless quick paging signal includes multiple time periods corresponding to mobile communication devices 301 and 302, respectively. In this example, the wireless quick paging signal is initially enabled for both mobile communication device 301 and mobile communication device 302.

In step 402, communication control system 310 determines the presence of a scheduled page for a mobile communication device. A page may be scheduled for the mobile communication device in response to a number of events. For example, a page may be scheduled in response to a call destined for the mobile communication device, a message, or other alerts.

In step 404, communication control system 310 processes a device profile for a mobile communication device in order to determine device profile information. For example, communication control system 310 may access device profiles database 320 which includes a plurality of device profiles corresponding to multiple mobile communication devices. The device profiles may include call records, device records, and/or other information useful for generating or disabling quick page signaling. Device profile information is contained within these records.

Communication control system 310 may process the device profile in response to some event. For example, communication control system 310 may process the device profile of mobile communication device 101 in response to mobile communication device 101 registering with access node 305, in response to the presence of a scheduled page for mobile communication device 101, and/or periodically.

In step 406, communication control system 310 determines whether the profile information satisfies profile criteria. Profile criteria may be, for example, a quick paging device threshold, device parameters, or both. Profile criteria may be determined in response to a mobile communication device registering with an access node, in response to the presence of a scheduled page for the mobile communication device, and/ or periodically.

Communication control system 310 may, for example, determine a device threshold for an individual device or group of devices based on the device profile information. The device threshold may be a fixed number of sequentially missed pages that can occur before the quick paging channel is disabled for that device. For example, communication control system 310 may examine the device profile information for mobile communication device 301 and determine based on the device profile information that it should set the quick paging device threshold to two. Thus, if mobile communication device 301 exceeds the threshold by missing two or more sequential pages, then the profile criteria is not satisfied.

Furthermore, communication control system 310 may also determine one or more device parameters based on the device profile information to be used as profile criteria. The device parameters may include, for example, a number of calls received parameter and time allowed between calls parameter. In one example of operation, communication control system 310 sets the number of calls parameter to three and time between calls parameter to four seconds. Thus, in this example, if mobile communication device 301 receives three calls and each call occurs within four seconds or less from the last, then the profile criteria is not satisfied.

If the profile information satisfies the profile criteria in step 406, then a quick paging signal is transmitted with the quick paging channel enabled during the time period corresponding to the mobile communication device in step 408.

However, if the profile information does not satisfy the profile criteria then a quick paging signal is transmitted with the quick paging channel disabled during the time period corresponding to the mobile communication device in step 410. In some embodiments, communication control system 310 may direct a wireless access node 305 to transmit a short message service (SMS) message or a voicemail to the mobile device in response to determining that the first quick paging channel should be disabled. SMS messages and voicemail messages may be easier for the mobile communication device to receive when the mobile communication device is experiencing poor reception.

In both cases (step 408 and step 410) communication control system 310 transfers a quick paging message to wireless access node 305 indicating whether the quick paging channel should be disabled.

Figure 5A:
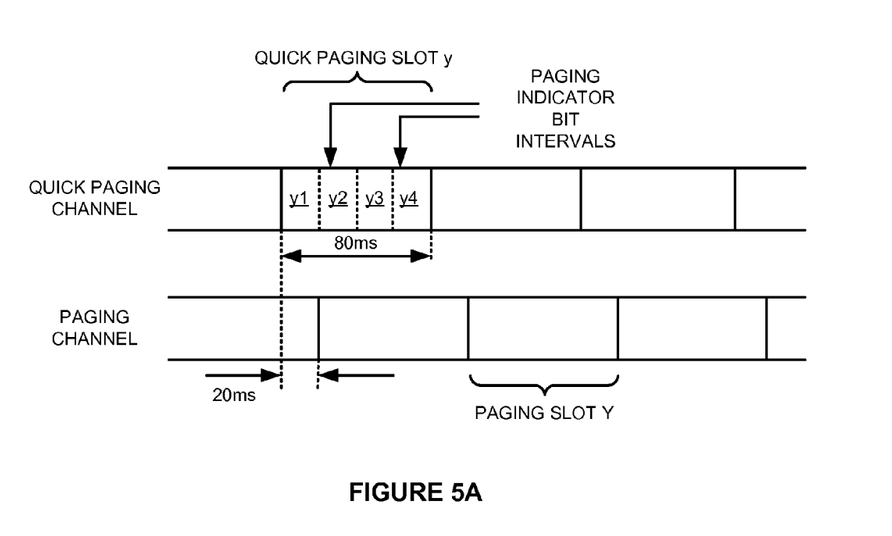
FIG. 5A illustrates a timing diagram of a quick page channel and a page channel according to an embodiment.

FIG. 5A illustrates a timing diagram of a quick page channel and a page channel. More particularly, FIG. 5A shows in detail how the quick page channel works in conjunction with the page channel, according to an embodiment of the invention for quick paging. Quick paging channels and paging channels may be divided into time slots. In this example, paging channel slots and a quick paging channel slots both last 80-ms and the quick paging channel slots are offset from (earlier than) paging channels slots by 20-ms. A hash algorithm typically determines the assigned paging channel slot for a mobile communication device operating in the slotted mode.

In operation, a mobile communication device may be assigned to paging channel slot Y. Rather than monitoring the entire 80-ms of paging channel slot Y, the mobile communication device instead monitors its paging indicators (or bits) in the quick paging channel slot y during pre-specified time periods or paging indicator intervals.

In some embodiments, each quick paging channel slot may be sub-divided into four 20-ms portions. In this case, the mobile communication device may monitor two paging indicator intervals in the quick paging channel. The two paging indicator intervals either fall in the first 20-ms portion (y1) and in the third 20-ms portion (y3) or in the second 20-ms portion (y2) and in the fourth 20-ms portion (y4). Thus, if two mobile communication devices are both assigned paging channel slot Y, the first mobile communication device may monitor a paging indicator interval in y1 and a paging indicator interval in y3 and the second mobile may monitor a paging indicator interval in y2 and a paging indicator interval in y4. However, the exact position of a paging indicator interval in the 20-ms portion may also be determined by a hash algorithm.

Figure 5B:
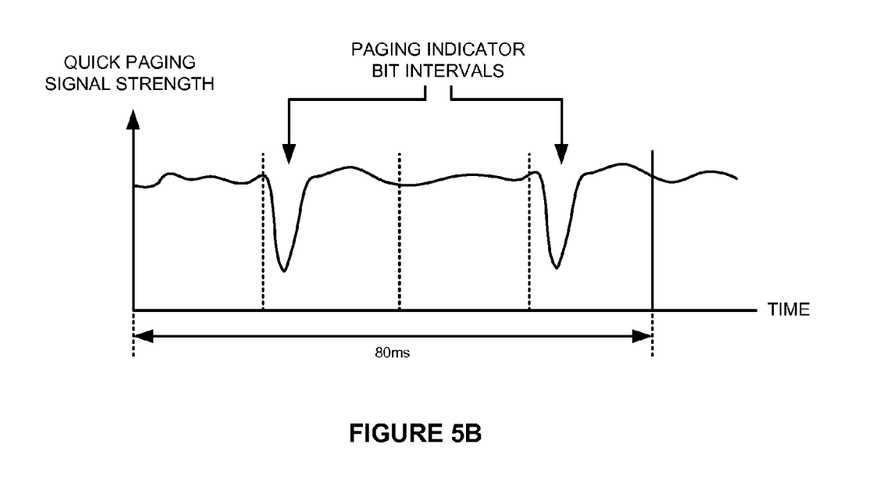
FIG. 5B illustrates a quick paging signal over a quick paging slot according to an embodiment.

FIG. 5B illustrates a quick paging signal transmitted over a quick paging channel during a slot according to an embodiment of the invention. For example, in order to control whether or not an interval of a quick paging channel is enabled, an access node may decrease the transmission power of the of the quick paging signal over the quick paging channel during specific time periods or quick paging intervals corresponding to a particular mobile communication device. In one example of operation, if the quick paging channel is decreased by 1 dB than the transmission power of the quick paging channel is decreased by 0.5 dB. However, actual values can be varied according to system requirements.

In some embodiments, the access node decreases the power or completely eliminates power on the quick paging channel for longer time periods than the indicator intervals in which the paging indicator bit or bits are located. This may reduce the load applied to the access node.

In other embodiments, the access node may not decrease or eliminate the power but may use other mechanisms to disable the quick paging channel for a mobile device. For example, the access node may not modulate the signal during a specified time interval or may modulate the signal differently during the specified time interval.

Figure 6:
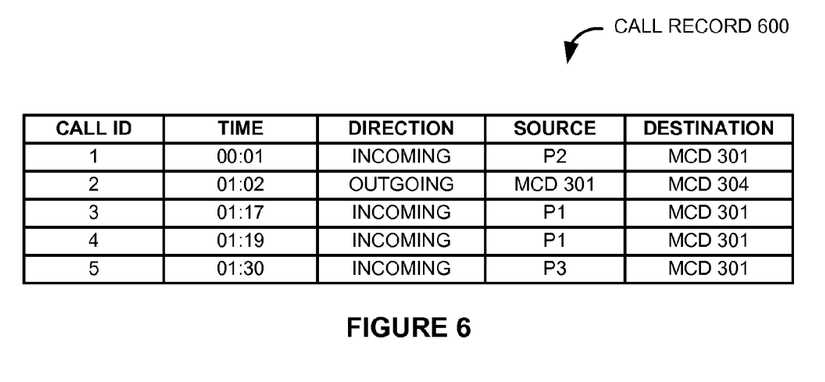
FIG. 6 illustrates an example of a call record according to an embodiment.

FIG. 6 illustrates an example of a call record according to an embodiment of the invention for quick paging. Call record 600 is provided as an example of a call record for mobile communication device 301. A call record may be incorporated into a device profile and reside in device profiles database 320. In this example, call records contain multiple entries representing one or more calls and each entry may contain various data fields. Each entry is given a unique Call Id number which identifies that entry. The data fields may contain characteristics of the call including, but not limited to, the time the call was placed, the call direction, the source of the call, and the destination of the call.

Referring to FIG. 3, call record 600 may be accessed by communication control system 310 and parsed by to determine device profile information. As shown in FIG. 6, the first entry (CALL ID 1) of call record 600 contains information on an incoming call that occurred at Time 00:01. In addition, other data fields of CALL ID 1 contain various characteristics about the call. For example, CALL ID 1 is an incoming call from source P1 to destination mobile communication device 301.

Figure 7:
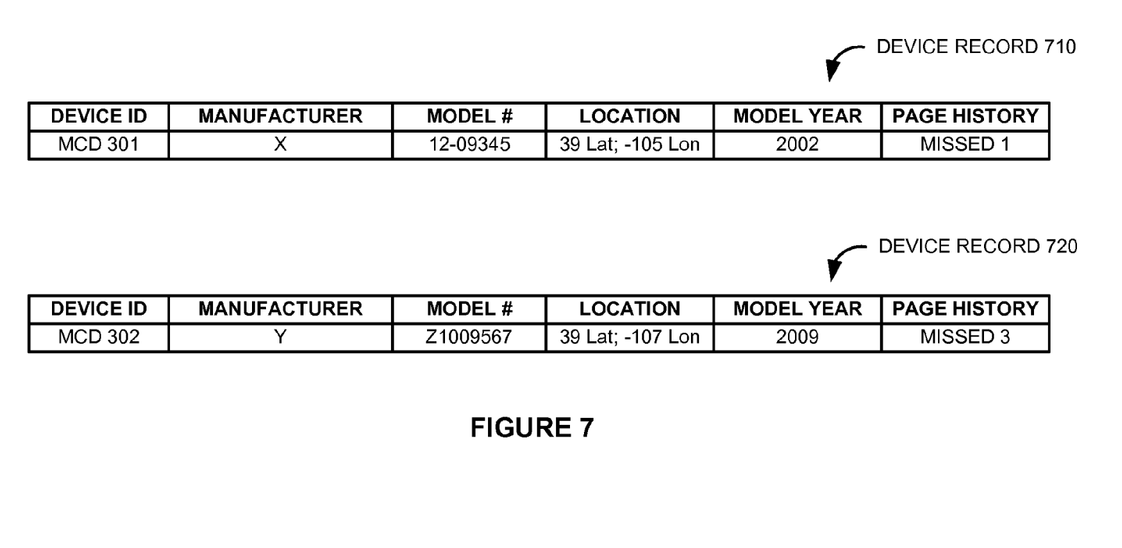
FIG. 7 illustrates an example of device records according to an embodiment.

FIG. 7 illustrates an example of device records according to an embodiment of the invention for quick paging. As shown, device record 710 and device record 720 are device records for mobile communication devices 301 and 302, of FIG. 3, respectively. A device record may be incorporated into a device profile and reside in device profiles database 320 of FIG. 3. Device records generally contain a single entry with various data fields which contain characteristics of a mobile communication device including, but not limited to, the device ID, the device manufacturer, the device model number, the location of the device, the age of the device, and the paging history of the device.

Referring to FIG. 3, device records 710 and 720 may be accessed by communication control system 310 and parsed in order to determine, for example, a paging threshold used to disable the quick paging interval of a quick paging channel under certain conditions. The mobile communication device as shown in device record 710 has a device ID MCD 301, is manufactured by company X, has a model number 12-09345, is currently located at 39 Latitude, −105 Longitude, is model year 2002 and has recently missed 1 page.

Figure 8:
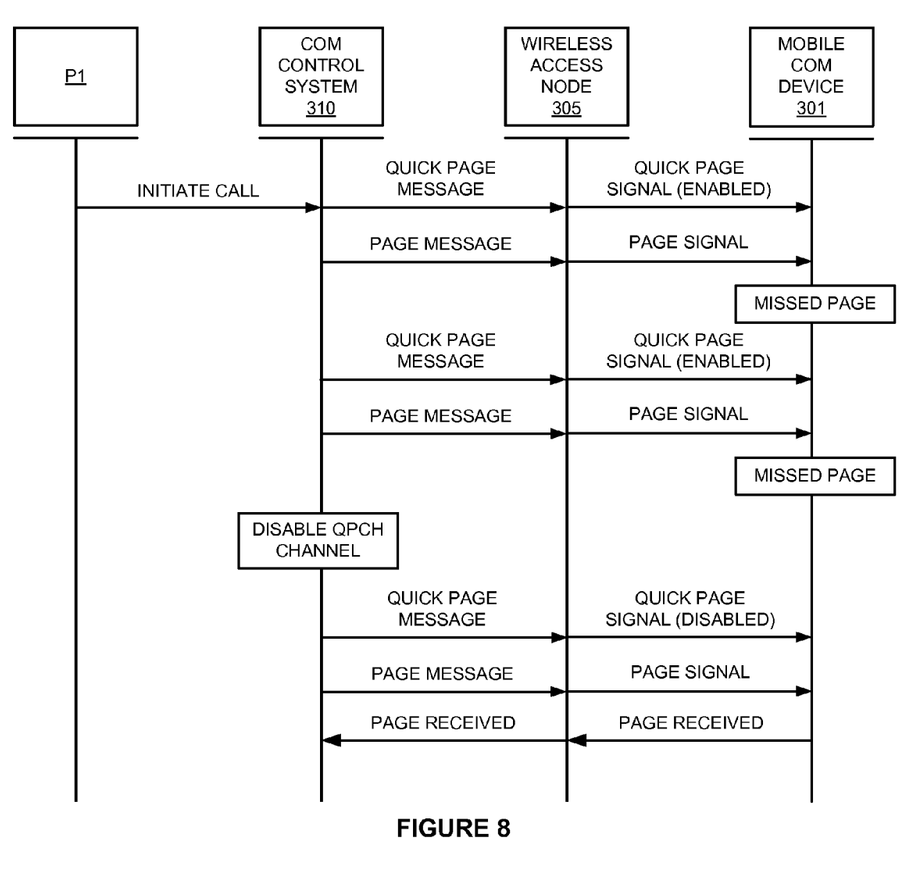
FIG. 8 is a sequence diagram that illustrates disabling a quick paging channel according to an embodiment.

FIG. 8 is a sequence diagram that illustrates disabling the quick paging channel according to an embodiment of the invention. In this example, communication control system 310 determines a quick paging threshold for paging criteria equal to two missed pages. Thus, after two missed pages, communication control system 310 disables the quick paging time interval within the quick paging channel corresponding to the particular mobile communication device that missed the pages.

Referring to FIG. 8, telephone P1 initiates a telephone call to communication control system 310. Communication control system 310 responds by transferring a quick paging message to wireless access node 305. Wireless access node 305 then transmits a quick paging signal to mobile communication devices 301 and 302. Mobile communication device 301 transitions from a sleep state to an idle state in order to monitor its quick paging interval. However, in this example, mobile communication device 301 improperly reads the quick paging indicator bits corresponding to mobile communication device 301 as inactive. Thus, mobile communication device 301 assumes that there is no imminent page and returns to an idle state in order to resume power savings. Communication control system 310 subsequently transfers a page message to wireless access node 305 and wireless access node 305 transmits a paging signal to mobile communication device 301. However, mobile communication device 301 does not receive the page because the device does not monitor its assigned paging slot as mobile communication device 301 does not believe it has an imminent page.

Communication control system 310 then transfers a second quick page message to wireless access node 305. As shown in this example, the second quick page message may be a re-try of the original quick page message as no acknowledgment of the page is received. However, in other embodiments, the second quick page message may also come in response to a new page, for example, a call from another mobile communication device 302, 303, or 304 or telephone systems P1, P2, or P3.

Wireless access node 305 receives the second quick page message and transmits a second quick page signal to mobile communication device 301. Again, mobile communication device 301 misinterprets the quick paging indicator bits and returns to an idle state. Communication control system 310 subsequently transfers a second page message to wireless access node 305. Wireless access node 305 transmits a second paging signal to mobile communication device 301, which again, is not received because mobile communication device 301 is in an idle state.

In response to the second missed page, communication control system 310 disables the quick paging channel for mobile communication device 301. Communication control system 310 transfers a message to wireless access node 305 indicating that the quick paging channel should be disabled during the quick paging interval corresponding to mobile communication device 301. Wireless access node 305 then transmits a quick paging message with at least the quick paging interval for mobile communication device 301 disabled. Because the quick paging interval corresponding to mobile communication device 301 is disabled, mobile communication device 301 cannot discern whether there is an imminent page for it in the upcoming paging channel and must remain in an active state (or transition to the active state) in order to monitor the paging signal in the upcoming assigned paging channel slot.

A paging signal is subsequently transmitted from wireless access node 305 to mobile communication device 301. As discussed, mobile communication device 301 remains in or transitions to an active power state in order to monitor its assigned paging channel slot.

As shown in FIG. 8, mobile communication device 301 transmits a response to wireless access node 305 indicating that the paging signal is properly received. In other embodiments, wireless access node 305 may become aware that the page was received through other means. Wireless access node 305 may then inform communication control system 310 that the page was received at mobile communication device 301.

Figure 9:
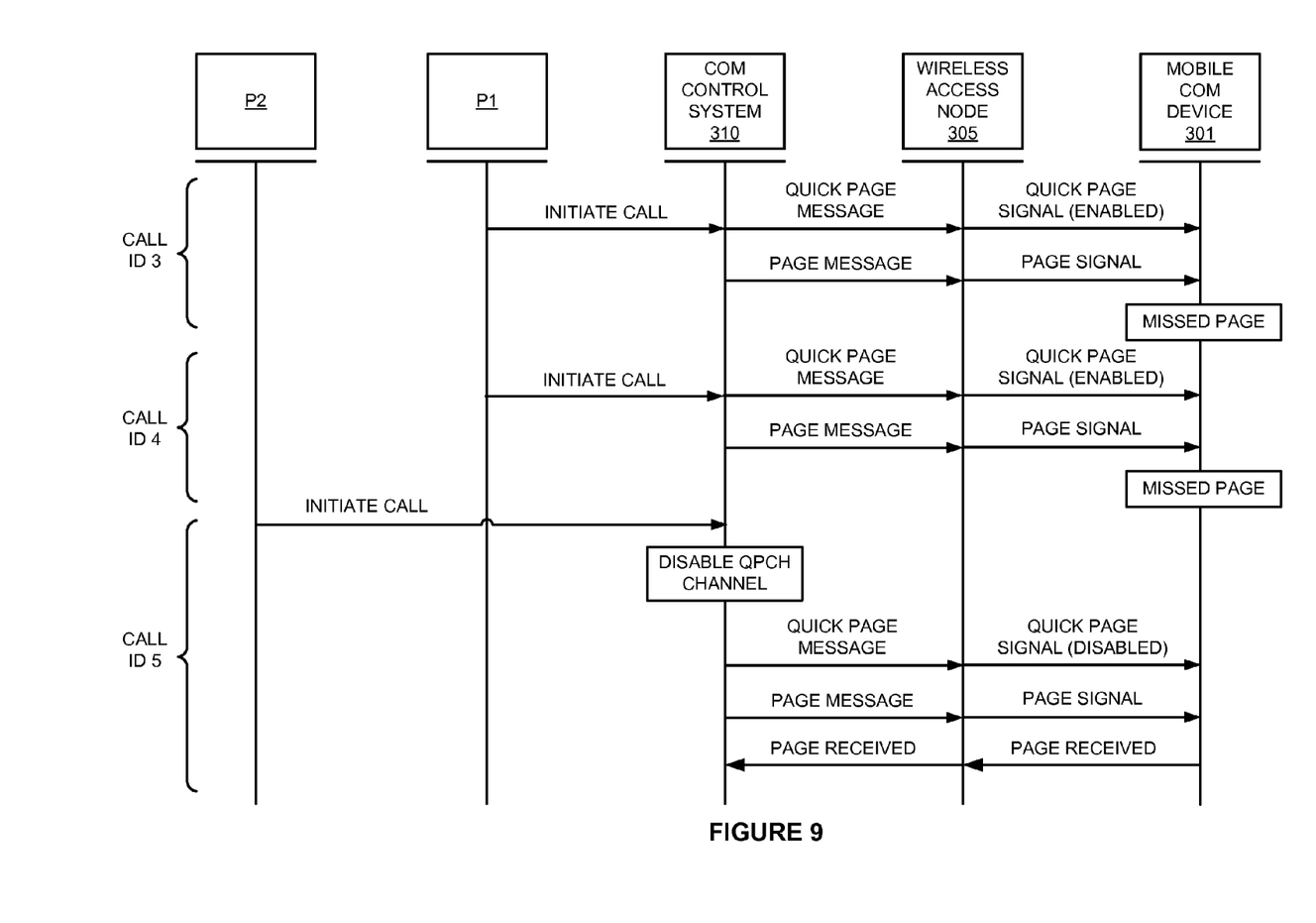
FIG. 9 is a sequence diagram that illustrates disabling a quick paging channel according to an embodiment.

FIG. 9 is a sequence diagram that illustrates disabling the quick paging channel according to another embodiment of the invention. In this example, communication control system 310 determines that the quick paging channel should be disabled in response to the mobile communication device's call history. In particular, this example illustrates the sequence of the three calls represented by the call entries CALL ID 3, CALL ID 4, and CALL ID 5 of call record 600.

Referring to FIGS. 6 and 9, telephone P1 initiates a telephone call for mobile communication device 301 at time 01:17. Communication control system 310 receives the call request and responds by transferring a quick paging message to wireless access node 305. Wireless access node 305 then transmits a quick paging signal to mobile communication devices 301 and 302. Mobile communication device 301 transitions from a sleep state to an idle state in order to monitor its quick paging interval, however, mobile communication device 301 improperly reads its quick paging indicator bits as inactive. Thus, mobile communication device 301 assumes that there is no imminent page and returns to an idle stat in order to resume power savings.

Communication control system 310 subsequently transfers a page message to wireless access node 305. In response, wireless access node 305 transmits a paging signal to mobile communication devices 301 and 302. However, mobile communication device 301 does not receive the page because it does not monitor its assigned paging slot as it does not believe it has an imminent page.

Unable to establish a call connection, telephone P1 initiates a second telephone call at time 01:19. Communication control system 310 receives the call request and transfers a second quick page message to wireless access node 305. Wireless access node 305 receives the second quick page message and transmits a second quick page signal to mobile communication device 301. Again, mobile communication device 301 misinterprets the quick paging indicator bits and returns to an idle state. Communication control system 310 transfers a second page message to wireless access node 305. Wireless access node 305 transmits a second paging signal to mobile communication device 301, which is, again is not received because mobile communication device 301 is in an idle state.

Telephone P2 initiates a third call (CALL ID 5) at time 01:30. In this example, communication control system 310 examines call record 600 in response to this third call and determines that the quick paging channel should be disabled. In particular, communication control system 310 may determine that the characteristics of previous calls indicate the likelihood of a missed page. For example, CALL ID 3 and CALL ID 4 are both incoming calls from telephone P1 to mobile communication device 301. The timing of these calls may indicate that a call connection was attempted and not established. That is, CALL ID 3 occurred at time 01:17 and CALL ID 4 occurred at time 01:19. Thus, communication control system 310 may determine that missed pages occurred.

In this example, communication control system 310 determines that two calls from P1 to mobile communication device 301 were missed and decides to disable the quick page channel. In determining whether to disable the quick page channel, communication control system 310 may also take into consideration the timing of CALL ID 5. Because CALL ID 5 is also destined for mobile communication device 301 and occurs at a time relatively shortly after several missed pages, this call activity also indicates a probability of another missed page.

After determining that the quick paging channel should be disabled for mobile communication device 301, communication control system 310 transfers a message to wireless access node 305 indicating that the quick paging channel should be disabled during the quick paging interval corresponding to mobile communication device 301. Wireless access node 305 then transmits a quick paging signal with the quick paging interval corresponding to mobile communication device 301 disabled. Because the quick paging interval corresponding to mobile communication device 301 is disabled, mobile communication device 301 cannot discern whether there is an imminent page for it in the upcoming paging channel and must remain in an active state (or transition to the active state) in or to monitor the paging signal on the upcoming paging slot assigned to it on the paging channel.

Referring back to FIG. 1, communication control system 110 may be any computer system, custom hardware, or other device configured to control the quick paging signaling to mobile devices 101 and 102. For example, communication control system 110 may transmit a control message directing wireless access node 105 to transmit quick paging signals to mobile devices 101 and 102. As shown, communication control system 110 is connected to wireless access node 105 via communication link 113.

Communication link 113 uses metal, air, space, optical fiber such as glass or plastic, or some other material as the transport media—including combinations thereof. Communication links 113 could use various communication protocols, such as time-division multiplexing (TDM), Internet Protocol (IP), Ethernet, telephony, optical networking, hybrid fiber coax (HFC), communication signaling, wireless protocols, or some other communication format—including combinations thereof. Communication links 121-122 could be a direct link or may include intermediate networks, systems, or devices.

Communication control system 110 may also include a communication interface and other components such a router, server, data storage system, and power supply. Communication control system 110 may reside in a single device or may be distributed across multiple devices. Communication control system 110 is shown externally to wireless access node 105, but could be integrated with wireless access node 105. Communication control system 110 could be a mobile switching center, network gateway system, Internet access node, application server, service node, or some other communication system—including combinations thereof.

Wireless access node 105 comprises radio frequency (RF) communication circuitry and an antenna. The RF communication circuitry typically includes an amplifier, filter, RF modulator, and signal processing circuitry. Wireless access node 105 may also comprise a router, server, memory device, software, processing circuitry, cabling, power supply, network communication interface, structural support, or some other communication apparatus. Wireless access node 105 could be a base station, Internet access node, telephony service node, wireless data access point, or some other wireless communication system—including combinations thereof.

Wireless links 111 and 112 use the air or space as the transport media. Wireless links 111 and 112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 113 uses metal, glass, air, space, or some other material as the transport media. Communication link 113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 113 could be a direct link or may include intermediate networks, systems, or devices.

Wireless mobile communication devices 101 and 102 comprise RF communication circuitry and an antenna. The RF communication circuitry typically includes an amplifier, filter, modulator, and signal processing circuitry. Wireless mobile communication devices 101 and 102 may also include a user interface, memory device, software, processing circuitry, or some other communication components. Mobile communication device 101 may be a telephone, computer, e-book, mobile Internet appliance, wireless network interface card, media player, game console, or some other wireless communication apparatus—including combinations thereof.

Figure 10:
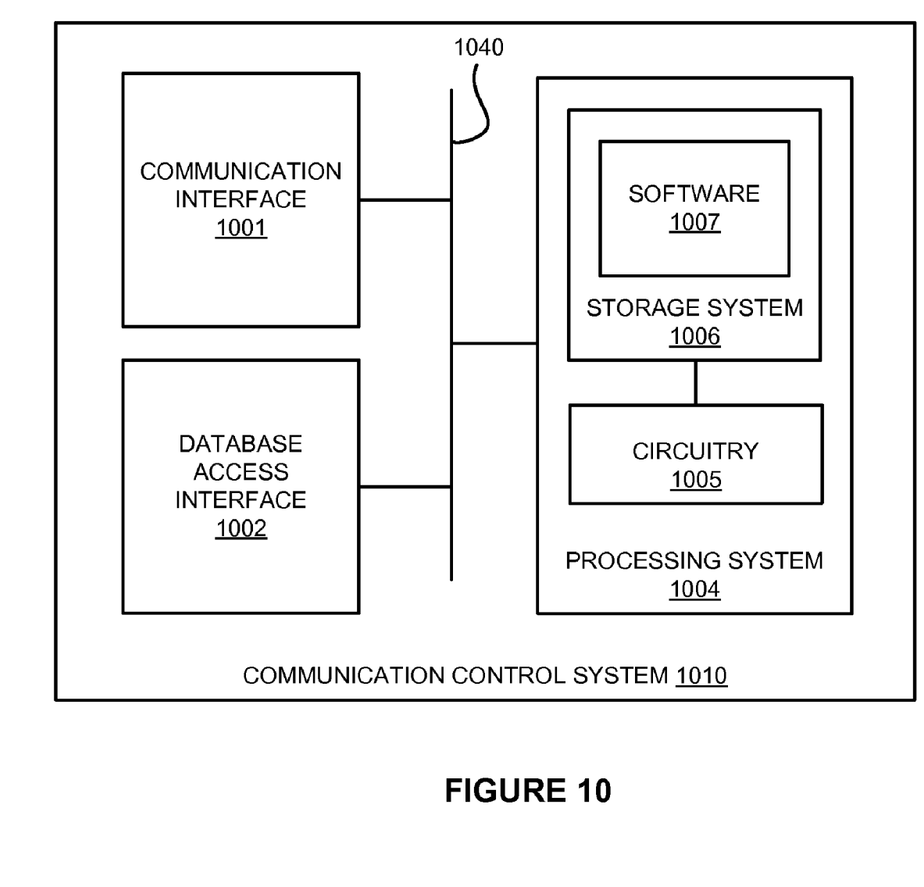
FIG. 10 is a block diagram illustrating a communication control system for quick paging in a communication system.

FIG. 10 illustrates communication control system 1010 according to an embodiment. Communication control system 1010 is an example of communication control system 310 of FIG. 3 and communication control system 110 of FIG. 1, although these systems may use alternative configurations. Communication control system 1010 could be a discrete system or could be integrated onto another system. Communication control system 1010 comprises communication interface 1001, database access interface 1002, and processing system 1004 which communicate over bus 1040.

Processing system 1004 comprises processing circuitry 1005 and storage system 1006 that stores operating software 1007. Communication control system 1010 may include other well-known components that are not shown for clarity, such as enclosures and power systems. Database access interface 1002 comprises circuitry for communicating with device profiles database 320, shown in FIG. 3.

Figure 11:
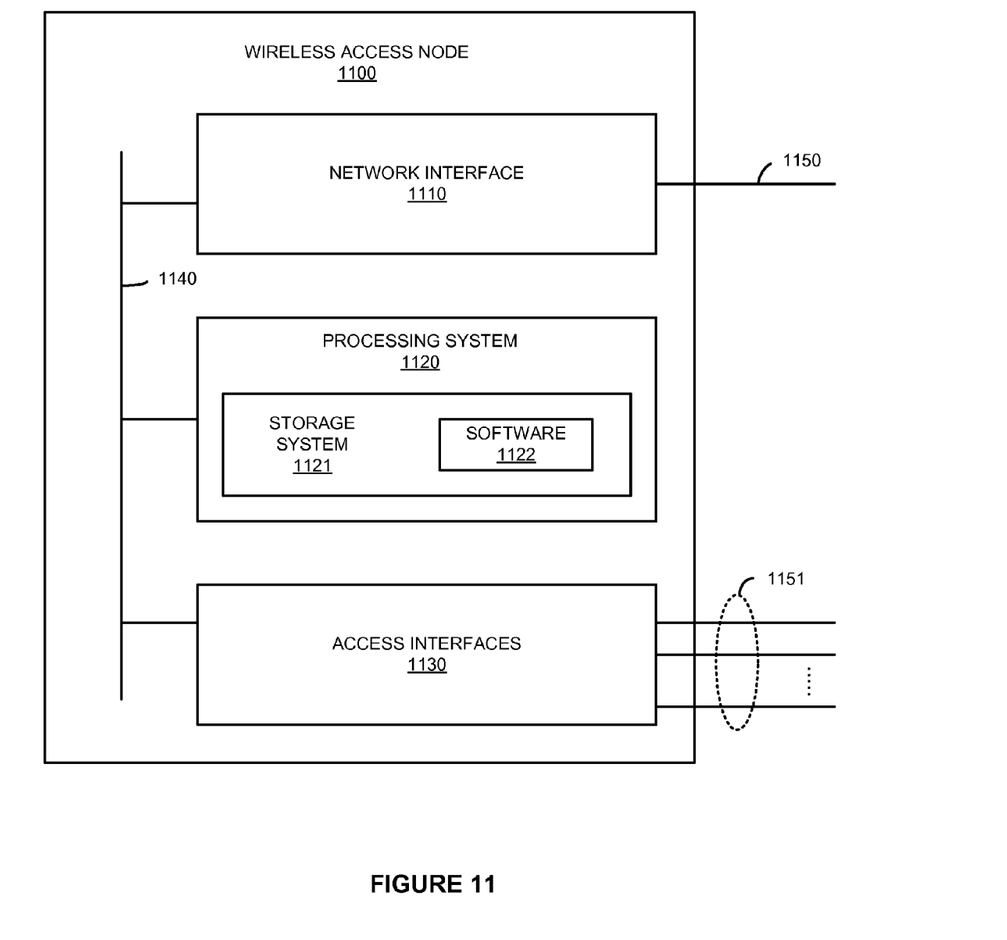
FIG. 11 is a block diagram illustrating a wireless access node according to an embodiment.

FIG. 11 is a block diagram illustrating wireless access node 1100, as an example of wireless access node 105 found in FIG. 1 or wireless access nodes 305 and 306 found in FIG. 3, although wireless access node 105 or wireless access nodes 305 and 306 could use other configurations. Wireless access node 1100 includes network interface 1110, processing system 1120, and access interfaces 1130. Network interface 1110, processing system 1120, and access interfaces 1130 communicate over bus 1140. Wireless access node 1100 may be distributed among multiple devices that together form elements 1110, 1120-1122, 1130, 1140, and 1150-1151.

Wireless access node 1100 could be a base station, Internet access node, telephony service node, wireless data access point, or some other wireless communication system—including combinations thereof.

Network interface 1110 comprises network router and gateway equipment for communicating with access and communication networks of a wireless communication provider, such as with other systems of access network 350, other systems of communication network 360, or communication control system 310. Network interface 1110 exchanges user communications and overhead communications with a communication network of a wireless communication system to provide communication services, omitted for clarity, over link 1150. Link 1150 could use various protocols or communication formats as described herein for links 113 or 315-316, including combinations, variations, or improvements thereof.

Processing system 1120 includes storage system 1121. Processing system 1120 retrieves and executes software 1122 from storage system 1121. In some examples, processing system 1120 is located within the same equipment in which network interface 1110 or access interfaces 1130 are located. Storage system 1121 could include a computer-readable medium such as a disk, tape, integrated circuit, server, or some other memory device, and also may be distributed among multiple memory devices. Software 1122 may include an operating system, logs, utilities, drivers, networking software, and other software typically loaded onto a computer system.

Software 1122 could contain an application program, firmware, or some other form of computer-readable processing instructions. When executed by processing system 1120, software 1122 directs processing system 1120 to operate as described herein, such as controlling quick page messages as well as determining quick paging criteria.

Access interfaces 1130 comprise communication interfaces for communicating with mobile communication devices. Access interfaces 1130 could include transceiver equipment and antenna elements for exchanging user communications and overhead communications with mobile communication devices in a mobile communication system, omitted for clarity, over links 1151. In some examples, two or more of links 1151 are used to communicate with a single mobile communication device using different spreading codes. Access interfaces 1130 also receive command and control information and instructions from processing system 1120 for controlling the operations of mobile communication devices over links 1151, as well as for coordinating handoffs of mobile communication devices between other wireless access nodes or base stations. Links 1151 could each use various protocols or communication formats as described herein for wireless links 111-112 or 311-314, including combinations, variations, or improvements thereof.

Bus 1140 comprises a physical, logical, or virtual communication link, capable of communicating data, control signals, and communications, along with other information. In some examples, bus 1140 is encapsulated within the elements of network interface 1110, processing system 1120, or access interfaces 1130, and may be a software or logical link. In other examples, bus 1140 uses various communication media, such as air, space, metal, optical fiber, or some other signal propagation path, including combinations thereof. Bus 1140 could be a direct link or might include various equipment, intermediate components, systems, and networks.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to communicate with a plurality of mobile communication devices over a quick paging channel, the method comprising:
   during at least an initial period of time corresponding to a mobile communication device of the plurality of mobile communication devices, enabling the quick paging channel used for transferring paging information to the mobile communication device;
   processing a device profile for the mobile communication device to determine if the quick paging channel should be disabled during a next period of time corresponding to the mobile communication device; and
   in response to determining that the quick paging channel should be disabled, disabling the quick paging channel during the next period of time corresponding to the mobile communication device, wherein disabling the quick paging channel comprises transmitting a quick paging signal over the quick paging channel below a power threshold.

2. The method of claim 1 wherein the device profile includes device profile information and processing the device profile for the mobile communication device comprises processing the device profile information to determine whether the device profile information satisfies profile criteria.

3. The method of claim 2 wherein the device profile information comprises a device record including a device model year, the profile criteria comprises a device threshold indicating an allowable number of missed pages for the device model year, and wherein processing the device profile information to determine whether the device profile information satisfies profile criteria comprises determining whether an actual number of missed pages exceeds the allowable number of missed pages.

4. The method of claim 3 wherein the device record further comprises a device manufacturer, a device model number, a device location, and a page history of a device.

5. The method of claim 2 wherein the device profile information comprises a call record including a plurality of calls received by the device, the profile criteria comprises a call received parameter indicating an allowable number of missed calls, and wherein processing the device profile information to determine whether the device profile information satisfies profile criteria comprises determining whether the plurality of calls received exceeds the allowable number of missed calls.

6. The method of claim 5 wherein the call record further comprises a call time, a direction of the call, a source of the call, and a destination of the call.

7. The method of claim 1 further comprising transmitting an SMS message in response to determining that the quick paging channel should be disabled.

8. The method of claim 1 further comprising transmitting a voicemail to the mobile device in response to determining that the quick paging channel should be disabled.

9. A communication system comprising:
a communication control system configured to transmit a first communication message to enable, during at least an initial period of time corresponding to a mobile communication device of a plurality of mobile communication devices, a quick paging channel used for transmitting paging information to the mobile communication device, to process a device profile for the mobile communication device and determine if the quick paging channel should be disabled during a next period of time corresponding to the mobile communication device, and to transmit a second communication message if the quick paging channel should be disabled; and
a wireless access node coupled to the communication control system and configured to receive the first communication message, to receive the second communication message, and to disable the quick paging channel during the next period of time corresponding to the mobile communication device in response to the second communication message, wherein, to disable the quick paging channel, the wireless access node is configured to transmit a quick paging signal below a power threshold.

10. The communication system of claim 9 wherein the device profile includes device profile information and processing the device profile for the mobile communication device comprises processing the device profile information to determine whether the device profile information satisfies profile criteria.

11. The communication system of claim 10 wherein the device profile information comprises a device record including a device model year, the profile criteria comprises a device threshold indicating an allowable number of missed pages for the device model year, and wherein to process the device profile information to determine whether the device profile information satisfies profile criteria, the communication control system determines whether an actual number of missed pages exceeds the allowable number of missed pages.

12. The communication system of claim 11 wherein the device record further comprises a device manufacturer, a device model number, a device location, and a page history of a device.

13. The communication system of claim 10 wherein the device profile information comprises a call record including a plurality of calls received by the device, the profile criteria comprises a call received parameter indicating an allowable number of missed calls, and wherein to process the device profile information to determine whether the device profile information satisfies profile criteria, the communication control system determines whether the plurality of calls received exceeds the allowable number of missed calls.

14. The communication system of claim 13 wherein the call record further comprises a call time, a direction of the call, a source of the call, and a destination of the call.

15. The communication system of claim 9 further comprising the communication control system configured to transmit an SMS message in response to determining that the quick paging channel should be disabled.

16. The communication system of claim 9 further comprising the communication control system configured to transmit a voicemail to the mobile device in response to determining that the quick paging channel should be disabled.

17. A method of operating a communication system comprising a communication control system and a wireless access node, the method comprising:
transferring a first communication message from the communication control system for delivery to the wireless access node to enable, during at least an initial period of time corresponding to a mobile communication device of a plurality of mobile communication devices, a quick paging channel used for transferring paging information to the mobile communication device;
processing a device profile for the mobile communication device to determine if the quick paging channel should be disabled during a next period of time corresponding to the mobile communication device;
transferring a second communication message from the communication control system for delivery to the wireless access node if the quick paging channel should be disabled;
receiving the first communication message in the wireless access node and transmitting a wireless quick paging signal over the quick paging channel to the plurality of mobile communication devices; and
receiving the second communication message in the wireless access node and disabling the quick paging channel during the next period of time corresponding to the mobile communication device, wherein disabling the quick paging channel comprises transmitting a quick paging signal over the quick paging channel below a power threshold.

* * * * *